(12) United States Patent
Lin et al.

(10) Patent No.: US 8,193,261 B2
(45) Date of Patent: Jun. 5, 2012

(54) HALOGEN-FREE FLAME RETARDING MASTERBATCH WITH LOW PHOSPHOROUS CONTENT, COMPOSITION AND PROCESS FOR PREPARING THE SAME AND FLAME RETARDING ARTICLE CONTAINING THE SAME

(75) Inventors: Sheng-Jen Lin, Taoyuan (TW); Hsi-Wen Chang, Jhonghe (TW); Nai-Yun Liang, Taipei (TW); Wei-Peng Lin, Sijhih (TW); Ying-Hsiu Hsiao, Tu-Chen (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 242 days.

(21) Appl. No.: 12/648,049

(22) Filed: Dec. 28, 2009

(65) Prior Publication Data
US 2011/0098379 A1    Apr. 28, 2011

(30) Foreign Application Priority Data
Oct. 28, 2009    (TW) ................................ 98136534 A

(51) Int. Cl.
*C08J 3/20* (2006.01)

(52) U.S. Cl. ........ 523/351; 524/127; 524/236; 524/414; 524/416; 524/423

(58) Field of Classification Search .................. 523/351; 524/127, 236, 414, 416, 423
See application file for complete search history.

(56) References Cited

U.S. PATENT DOCUMENTS
2010/0256262 A1* 10/2010 Masaki et al. .................... 524/9
* cited by examiner

*Primary Examiner* — Edward Cain
(74) *Attorney, Agent, or Firm* — Thomas, Kayden, Horstemeyer & Risley, LLP

(57) ABSTRACT

Disclosed herein is a composition for preparing a halogen-free flame retarding masterbatch with low phosphorous content. The flame retarding masterbatch includes a phosphorus-containing flame retardant in an amount of about 0.1-6 wt %, a sulfur-containing flame retardant in an amount of about 0.1-5 wt %, a tertiary or quaternary ammonium salt having tri- or tetra-functional groups in an amount of about 0.1-5 wt %, a thermoplastic polymer in an amount of about 79-99.6 wt %, and a dispersing agent in an amount of about 0.1-5 wt % in the composition.

22 Claims, 1 Drawing Sheet

HALOGEN-FREE FLAME RETARDING MASTERBATCH WITH LOW PHOSPHOROUS CONTENT, COMPOSITION AND PROCESS FOR PREPARING THE SAME AND FLAME RETARDING ARTICLE CONTAINING THE SAME

RELATED APPLICATIONS

This application claims priority to Taiwan application no. 98136534, filed Oct. 28, 2009, the entirety of which is incorporated herein by reference.

BACKGROUND

1. Field of Disclosure

The present disclosure relates to a flame retarding material. More particularly, the present disclosure relates to a halogen-free flame retarding material with low phosphorous content.

2. Description of Related Art

Flame retardants are widely used in plastic and textile materials so as to bestow combustion-inhibiting or flame-resistant properties to the final products. Depending on the principal component, flame retardants can be categorized in to halogenated flame retardants, phosphorus-containing flame retardants, phosphorus and nitrogen containing flame retardants and inorganic flame retardants.

The principal component of the halogenated flame retardants is halocarbon such as polychlorinated biphenyl, chlorinated paraffin, polybrominated biphenyl, and polybromophenyl ether. Halogenated flame retardants are known to exhibit good flame-retarding efficacy and are highly compatible with plastic materials. Moreover, the halogenated flame retardants would not significantly affect the inherent properties of the plastic materials, and thus would not jeopardize the mechanical properties of the final products. Therefore, halogenated flame retardants are widely used in various plastic and textile products in the early days. During combustion, however, the halogenated flame retardants may produce black smokes that are sometimes corrosive; more particularly, some halogenated flame retardants may produce carcinogenic substances. In view of the safety concerns to the environment and human health, most halogenated flame retardants are banned for use in textile products, with only a small portion of halogenated flame retardants are allowed in plastic materials.

Common examples of phosphorus-containing flame retardants may include, but are not limited to red phosphorus, polyphosphate and ammonium polyphosphate. The phosphorus content of the red phosphorus may be up to 100%, and hence, theoretically, red phosphorus should be the most effective one among all the phosphorus-containing flame retardants. However, the appearance of the red phosphorus is usually black or red which together with its poor compatibility with plastic materials and poor processability limit its application in the plastic and textile fields. On the other hand, polyphosphate and ammonium polyphosphate are widely used in the textile field as flame retardants. However, in order to exhibit satisfactory fire retarding efficacy, the required content of such flame retardants is as high as 30 wt % which may not only increase the manufacturing cost but also decrease the spinnability of the material. In addition, phosphorus-containing flame retardants may cause dripping effect during combustion.

Phosphorus and nitrogen containing flame retardants, also known as intumescent flame retardants, are halogen-free flame retardants. Examples of intumescent flame retardants are ammonium polyphosphate, melamine (trimeric cyanamide) and pentaerythritol. The phosphorus and nitrogen containing flame retardants would increase the carbon source and acid source and swell upon heating. In addition, they produce less smoke and substantially no toxic gases during burning. However, the processability and weather resistance of the phosphorus and nitrogen containing flame retardants are less satisfactory, and hence, the properties thereof may change under the influences of the weather and environment. Moreover, phosphorus and nitrogen containing flame retardants may be separated from the matrix material, for example, while being damped or hydrolyzed.

Inorganic flame retardants include antimony trioxide, magnesium hydroxide, aluminium hydroxide, and zinc borate. These materials produce less smoke during combustion, and usually release substances such as water and carbon dioxide that are more environmentally friendly. However, the flame retarding efficacy of such inorganic materials is not as desirable as the organic flame retardants. Hence, the inorganic materials should be added in a substantially great amount to bestow a satisfactory flame retarding efficacy to the final product material. Besides, such inorganic materials are poorly compatible with thermoplastic materials such as resins, and hence they tend to aggregate within the thermoplastic materials.

In sum, various problems are experienced while using the flame retardants in the textile field. Such problems are, for example, poor in processability, washing fastness and mechanical properties. Regarding the finished flame retarding textiles, the textiles may not possess desirable transparency. Also, the textiles, during combustion, may not exhibit satisfactory flame retarding efficacy and may cause dripping effect.

In view of the foregoing, there exits an urgent need in the related field to provide a novel flame retarding materials that possess both desirable processing characteristics and flame retarding efficacy.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In one aspect, the present disclosure is directed to a composition for preparing a halogen-free flame retarding masterbatch with low phosphorous content. The halogen-free flame retarding masterbatch with low phosphorous content prepared from such composition exhibits both flame retarding and non-dripping effects. In addition, the content of the phosphorous-containing flame retarding in such composition is lower than that of the conventional composition. Lower phosphorous-containing flame retarding content may reduce the manufacturing cost and also improved the spinnability and other mechanical properties of the masterbatch.

According to one embodiment of the present disclosure, the composition comprises a phosphorus-containing flame retardant in an amount of about 0.1-6wt %, a sulfur-containing flame retardant in an amount of about 0.1-5 wt %, a tertiary or quaternary ammonium salt having tri- or tetra-functional groups in an amount of about 0.1-5 wt %, a thermoplastic polymer in an amount of about 79-99.6 wt %, and a dispersing agent in an amount of about 0.1-5 wt % in the composition.

In another aspect, the present disclosure is directed to a method for preparing a halogen-free flame retarding masterbatch with low phosphorous content. Generally, the composition(s) used to preparing the halogen-free flame retarding masterbatch with low phosphorous content in accordance with such method may fall within the scope of the composition presented in the above-mentioned aspect/embodiment(s).

According to one embodiment of the present disclosure, the method comprises the steps as follows. About 0.1-6 wt % phosphorous-containing flame retardant powder, about 0.1-5 wt % tertiary ammonium salt having tri- or tetra-functional groups or the quaternary ammonium salt having tri- or tetra-functional groups, about 0.1-5 wt % dispersing agent, and about 79-99.6. wt % thermoplastic polymer are admixed to form an admixture. Thereafter, about 0.1-5 wt % sulfur-containing flame retardant powder is added into the admixture to form a composition for compounding. The composition is compounded for about 1-20 minutes at a compounding temperature of about 220-270° C. to obtain a compounded product. Afterwards, the compounded product is pelletized to obtain the halogen-free flame retarding masterbatch with low phosphorous content.

In yet another aspect, the present disclosure is directed to a halogen-free flame retarding material with low phosphorous content.

According to one embodiment of the present disclosure, the halogen-free flame retarding material comprises a modified thermoplastic polymer, and a flame retardant dispersed within the modified thermoplastic polymer, wherein the flame retardant comprises a phosphorous-containing flame retardant and a sulfur-containing flame retardant, and a weight ratio of the modified thermoplastic polymer to the flame retardants is about 7:1 to 500:1.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

DETAILED DESCRIPTION

Figure 1A:
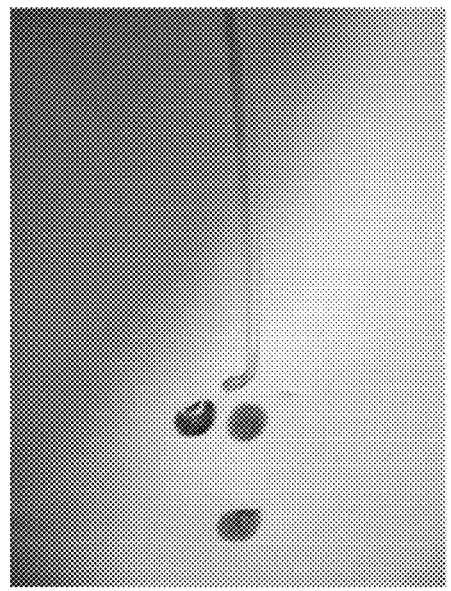
FIG. 1A is a photo illustrating the after-burnt appearance of a pure nylon chip.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Factors to be taken into account while manufacturing a flame retarding material may include the compatibility between the flame retardant and the thermoplastic material, the effects the flame retardant may impose on the mechanical properties of the thermoplastic material, flame retarding efficacy of the flame retarding material, the processability of the flame retarding material, the price/performance ratio of the flame retarding material, and safety concerns to the environment and human health during the processing and/or burning of the flame retarding material.

In view of the foregoing and other factors, a first aspect of the present disclosure is directed to a composition for preparing a halogen-free flame retarding masterbatch with low phosphorous content. Generally, the composition for preparing such masterbatch comprises a phosphorous-containing flame retardant powder, a sulfur-containing flame retardant powder, a tertiary ammonium salt having tri- or tetra-functional groups or a quaternary ammonium salt having tri- or tetra-functional groups, a thermoplastic polymer, and a dispersing agent. Examples and proportions of the aforementioned constituents are provided hereinafter.

According to embodiments of the present disclosure, two kinds of flame retardants (a phosphorous-containing flame retardant powder and a sulfur-containing flame retardant powder) are used in the present composition. In optional embodiments, the phosphorous-containing flame retardant powder may be polyphosphates or ammonium polyphosphates. In optional embodiments, the sulfur-containing flame retardant powder may be aluminum sulfate, zinc sulfate, barium sulfate or ammonium sulfate.

Phosphorous-containing flame retardant is one of the commonly used flame retardants in textile field. Conventional masterbatches usually comprise 20-30 wt % phosphorus-containing flame retardants so as to provide the masterbatches and/or the resultant flame retarding textiles with a desirable flame retarding efficacy. Nevertheless, the composition according to embodiments of the present disclosure comprises a flame retardant present in an amount of about 0.1-6 wt %, while the resultant masterbatch may still exhibit an adequate flame retarding efficacy.

Specifically, the weight percent of the phosphorous-containing flame retardant of the total composition may be about 0.1, 0.2, 0.3, 0.4, 0.5, 0.6, 0.7, 0.8, 0.9, 1, 1.5, 2, 2.5, 3, 3.5, 4, 4.5, 5, 5.5 or 6%.

Sulfur-containing flame retardants, on the other hand, are widely used in chemical foam fire extinguishers. The sulfur-containing flame retardants would undergo chemical reaction(s) to form a thick foam that is capable to prevent oxygen from reaching the flame so as to extinguish the fire. Although the sulfur-containing flame retardants can be used to extinguish the fire, they have poor compatibility with thermoplastic polymers (such as nylon), and tend to aggregate within the thermoplastic materials. Hence, sulfur-containing flame retardants are not suitable for use in the thermoplastic polymer in the textile field.

However, according to the principle and spirit of the present disclosure, a tertiary ammonium salt having tri- or tetra-functional groups or a quaternary ammonium salt having tri- or tetra-functional groups is used as modifier of the thermoplastic polymer to improve the compatibilities and dispersibility of the sulfur-containing flame retardant powder and the phosphorous-containing flame retardant powder with/within the thermoplastic material.

The sulfur-containing flame retardant powder, upon burning, would release the crystallization water. In addition, sulfur atoms within the sulfur-containing flame retardant powder and the thermoplastic polymer molecules would undergo a dehydration reaction to for a char. The char is capable of blocking the oxygen and heat from entering the polymer molecules whereby preventing the dripping and improving the flame retarding efficacy.

In various embodiments, the amount of the sulfur-containing flame retardant of the total composition may be about 0.1-5 wt %. Specifically, the weight percent of the sulfur-containing flame retardant of the total composition may be about 0.1, 0.2, 0.3, 0.4, 0.5, 0.6, 0.7, 0.8, 0.9, 1, 1.5, 2, 2.5, 3, 3.5, 4, 4.5 or 5%.

In optional embodiments, the phosphorous-containing flame retardant powder and sulfur-containing flame retardant powder are micrometer scale powders, thereby improving the uniformity while being distributed within the thermoplastic polymer. For example, the phosphorous-containing flame retardant powder and the sulfur-containing flame retardant may have a diameter of about 1-10 µm, specifically, about 1, 2, 3, 4, 5, 6, 7, 8, 9 or 10 µm.

According to the principle and spirit of the present disclosure, a tertiary ammonium salt having tri- or tetra-functional groups or the quaternary ammonium salt having tri- or tetra-functional groups can be used as a modifier to modify the property of the thermoplastic polymer. Specifically, said modifier would collide with the molecular chain of the thermoplastic polymer under the heat of the compounding process thereby forming a network structure having more free volume. Such network structure may facilitate the uniform distribution of the sulfur-containing flame retardant powder and phosphorous-containing flame retardant powder within the thermoplastic polymer. Moreover, said network structure may further improve the heat resistance of the thermoplastic polymer.

Illustrative examples of the tertiary ammonium salt or quaternary ammonium salt may include, but are not limited to, triethylammonium salt, trivinylammonium salt, tetravinylammonium salt, triallylamine, triallyl trimesate, triallyl cyanurate, triallyl isocynaurate and triacryloylhexahydro-1,3,5-triazine.

According to various embodiment, the amount of the tertiary ammonium salt or quaternary ammonium salt present in the total composition may be about 0.1-5 wt; for example, about 0.1, 0.2, 0.3, 0.4, 0.5, 0.6, 0.7, 0.8, 0.9, 1, 1.5, 2, 2.5, 3, 3.5, 4, 4.5 or 5 wt %.

The dispersing agent may assist in uniform distribution of the constituents within the composition. Generally, the dispersing agent may be $C_{15-38}$ alkanes, $C_{15-38}$ esters, $C_{15-38}$ organic acids, and mixtures thereof. In the examples presented hereinafter, the dispersing agent used is paraffin.

According to various embodiments of the present invention, the weight percent of the dispersing agent of the composition for preparing a non-dripping flame retarding masterbatch is about 0.1% to about 55%. Specifically, the weight percent of the dispersing agent of the total composition may be about 0.1, 0.2, 0.3, 0.4, 0.5, 0.6, 0.7, 0.8, 0.9, 1, 1.5, 2, 2.5, 3, 3.5, 4, 4.5, or 5%.

Any synthetic thermoplastic polymer may be used according to the embodiments of the present invention; particularly those suitable for spinning process. Examples of the thermoplastic polymer may include, but are not limited to, polyester, polyamide, and polypropylene (PP).

Specifically, illustrative examples of polyester may include polyethylene terephthalate (PET), polybutylene terephthalate (PBT), and polytrimethylene terephthalate (PTT). Polyamide is a synthetic polymer family including, but not limited to, nylon 6, nylon 6.6 and nylon 6.10.

The weight percent of the thermoplastic polymer of the total composition is about 79% to about 99.6%. In some embodiments, the thermoplastic polymer is in an amount of about 85-90 wt %. Specifically, the weight percent of the thermoplastic polymer of the total composition may be about 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5 or 99.6%.

Also, another aspect of the present disclosure is directed to a method for preparing a halogen-free flame retarding masterbatch with low phosphorous content using the composition provided in the above-mentioned aspect/embodiments.

According to one embodiment of the present disclosure, the method comprises the steps as follows. About 0.1-6 wt % phosphorous-containing flame retardant powder, about 0.1-5 wt % tertiary ammonium salt having tri- or tetra-functional groups or the quaternary ammonium salt having tri- or tetra-functional groups, about 0.1-5 wt % dispersing agent, and about 79-99.6. wt % thermoplastic polymer are admixed to form an admixture. Thereafter, about 0.1-5 wt % sulfur-containing flame retardant powder is added into the admixture to form a composition for compounding. The composition is compounded for about 1-20 minutes at a compounding temperature of about 220-270° C. to obtain a compounded product. Afterwards, the compounded product is pelletized to obtain the halogen-free flame retarding masterbatch with low phosphorous content.

The compounding and pelletizing steps are carried out in the extruder. Any customary extruders and extrusion techniques for preparing masterbatches may be employed according to the embodiments of the present invention. A well-known compounding apparatus may include, but is not limited to, a twin screw extruder. During the operation of the twin screw extruder, the process parameters may be adjusted depending on the actual situation. For example, in one optional embodiment, the speed of the screw member may be adjusted to about 250-350 rpm.

In some embodiments, the mixing steps may be carried out in any suitable container or mixer. Thereafter, the composition is fed into an extruder for compounding and/or pelletizing the masterbatch. Alternatively, the mixing steps may be done in the extruder.

Some working examples according to embodiments of the present invention are provided hereinafter. Compositions used in each working examples (Examples A2, A3, B2 and B3) and comparative examples (Examples A1, B1, C1, and D1) are summarized in Table 1. The masterbatches of the examples were further spun into fibers, and the limited oxygen index (LOI) of each fiber was measured. The results of the LOI test are also presented in Table 1.

TABLE 1

| Example | Polyphosphate (wt %) | $Al_2(SO_4)_3$ (wt %) | $(NH_4)_2SO_4$ (wt %) | Modifier A (wt %) | Modifier B (wt %) | LOI |
|---|---|---|---|---|---|---|
| A1 | 6 | 5 | 0 | 0 | 0 | 22 |
| A2 | 6 | 5 | 0 | 3 | 0 | 24 |
| A3 | 6 | 5 | 0 | 0 | 3 | 28 |
| B1 | 6 | 0 | 5 | 0 | 0 | 21 |
| B2 | 6 | 0 | 5 | 3 | 0 | 23 |

TABLE 1-continued

| Example | Polyphosphate (wt %) | Al$_2$(SO$_4$)$_3$ (wt %) | (NH$_4$)$_2$SO$_4$ (wt %) | Modifier A (wt %) | Modifier B (wt %) | LOI |
|---|---|---|---|---|---|---|
| B3 | 6 | 0 | 5 | 0 | 3 | 26 |
| C1 | 11 | 0 | 0 | 0 | 0 | 24 |
| D1 | 0 | 11 | 0 | 0 | 0 | — |

In Table 1, Modifier A and B respectively represent trivinylammonium chloride and tetravinylammonium chloride.

Take working example B3 for example, the method for preparing the B3 halogen-free flame retarding masterbatch with low phosphorous content comprises the steps as follows. First, about 6 wt % polyphosphate, about 3 wt % tetraethylene ammonium chlorides, about 0.5 wt % paraffin and about 85.5 wt % nylon 6 were admixed well to form an admixture. Thereafter, about 5 wt % aluminum sulfate (in this case, (NH$_4$)$_2$SO$_4$) was added into the admixture to for a composition. The composition was compounded in a twin screw extruder at a compounding temperature of about 220-270° C. for about 20 minutes. After the compounding step, the compounded product was pelletized so as to produce the halogen-free flame retarding masterbatch with low phosphorous content of working example B3. Masterbatches of other working examples and comparative examples are prepared by similar process except the composition and/or weight ratio of the constituents were modified as specified in Table 1

The masterbatch was dried at about 85° C. in a baking oven. The dried masterbatch was spun into fiber, and the LOI value of the fiber was measured in accordance with the procedure set forth in ASTM standard D2863-00. LOI is used to indicate the relative flammability of plastics and other materials. In brief, the principle of the LOI test is to measure the minimum concentration of oxygen (i.e., LOI) that will just support flaming combustion of a material in a controlled oxygen/nitrogen mixture environment.

Generally, higher LOI value represents better flame retarding efficacy. In the related field, a material with an LOI≧20 is classified as flame retarding. However, in actual application, a flame retarding fiber must have an LOI≧26 (nonflammable grade) so as to exhibit acceptable fire retarding efficacy. A fiber with an LOI of 26 would start burning upon contacting with the flame, but the burning may go out as soon as the fiber leaves the flame and the fiber may get carbonized during the burning.

In comparative example D1, the amount of the aluminum sulfate powder of the total composition is about 11 wt %. In this case, severe aggregation of the aluminum sulfate was observed, and thus, it was unable to spin the D1 masterbatch into fiber. Accordingly, the LOI value of D1 is not available.

As can be seen in Table 1, the masterbatches of the present disclosure contains less phosphorous-containing flame retardant (relative to the conventional masterbatches). Nevertheless, the addition of the sulfur-containing flame retardant powder and the modifier may improve the flame retarding efficacy of the fibers produced from these compositions. For example, each of working examples A3 (LOI=28) and B3 (LOI=26) contains only about 6 wt % phosphorous-containing flame retardant powder, while the LOI values thereof are higher than comparative example C1 (LOI=24), which contains about 11 wt % phosphorous-containing flame retardant powder.

Dripping property of the fiber was also determined. Currently, there is no widely accepted standard for testing the dripping property of the fibers and textiles. In the present disclosure, UL 94 vertical combustion test, which is directed to the combustion behaviors of engineering plastics, was carried out to observe the dripping property of the sample.

The test results show that the chips made of the masterbatches of working examples A2, A3, B2 and B3 may form a char (carbonized layer) upon burning whereby preventing the generation of the dripping.

Figure 1B:
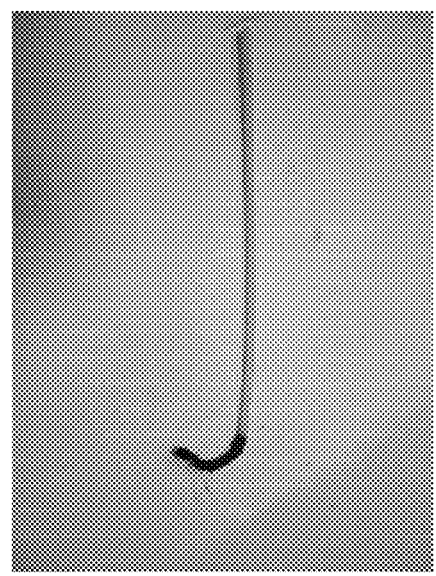
FIG. 1B is a photo illustrating the after-burnt appearance of a nylon chip of a halogen-free flame retarding masterbatch with low phosphorous content according to one example of the present disclosure.

FIG. 1A is a photo illustrating the after-burnt appearance of a pure nylon chip, while FIG. 1B is a photo illustrating the after-burnt appearance of a nylon chip of a halogen-free flame retarding masterbatch with low phosphorous content according to working example B3 of the present disclosure. As can be seen in FIG. 1A, no char was formed on the surface of the pure nylon chip, and significant dripping can be observed (the dropping on the surface of the chip is the dripping). In comparison, a char was formed on the surface of the chip of working example B3 (FIG. 1B) whereby preventing the formation of the dripping.

In yet another aspect, the present disclosure is directed to a halogen-free flame retarding material with low phosphorous content. In various embodiments, the halogen-free flame retarding material with low phosphorous content can be manufactured in a form of a masterbatch, a fiber, a filament, a yarn, a textile, a film, a sheet, or a chip.

According to embodiments of the present disclosure, the halogen-free flame retarding material with low phosphorous content comprises a modified thermoplastic polymer and a phosphorus-containing and a sulfur-containing flame retardants dispersed within the modified thermoplastic polymer, wherein the weight ratio of the modified thermoplastic polymer to the flame retardants is about 7:1 to 500:1. In this regard, the weight of modified thermoplastic polymer is the sum of the amount of the modifier and the amount of the thermoplastic polymer used in the composition for making this halogen-free flame retarding material with low phosphorous content.

In some optional embodiments, the weight ratio of the modified thermoplastic polymer to the flame retardants is about 7:1 to 10:1. Specifically, the weight ratio may be 7:1, 8:1, or 9:1. For example, according to the above-mentioned working examples B3, the sum of the weight percents of the modifier and the thermoplastic polymer is about 88.5%, while the weight percent of the two flame retardants is about 11%; therefore, the weight ratio of the modified thermoplastic polymer to the flame retardant is about 8.05:1 (~8:1).

According to the principle and spirit of the present disclosure, the halogen-free flame retarding material with low phosphorous content is at least partially made of/from the halogen-free flame retarding masterbatch with low phosphorous content disclosed herein. Hence, the constituents making up the composition and weight ratios thereof are disclosed in the above-described embodiments. Accordingly, for the sake of brevity, a description of the composition for preparing the halogen-free flame retarding material with low phosphorous content is not repeated.

According to the principle and spirit of the present disclosure, the halogen-free flame retarding masterbatch with low phosphorous content is suitable for use in a spinning process. Moreover, the masterbatch can be spun directly without adding additional pure thermoplastic masterbatch. A simulation analysis was conducted to determine the pressure rise of the masterbatch of working example A3 so as to evaluate the spinnability of the masterbatch. The simulation result shows that a relatively stable spinning pressure can be achieved during the spinning process of the halogen-free flame retarding masterbatch with low phosphorous content.

In addition, Textechno FPAC Strength Tester (Serial No. 35032) was used to determine the mechanical properties of the fibers made from the masterbatches of various working examples. The fibers were tested according to the protocol provided with the strength tester, and the tenacity and elongation data thus obtained are determined. Generally, fibers with desirable tenacity are suitable for subsequent process for forming the yarns; moreover, such fibers/yarns are suitable to be used in the machine for knitting or plain weaving. Elongation of a fiber is related to the extensibility of the fiber during the spinning process. Usually, a fiber with an elongation rate less than 30% may break during the subsequent process such as draw-spinning.

The analysis result shows that the tenacity of the fiber of comparative example C1 is about 1.77 g/den, while the tenacity of the fiber of the working example A3 is about 2.10 g/den. The improved tenacity of the fiber according to the present disclosure makes the fiber suitable to be used in the machine for knitting or plain weaving. In addition, the elongation of the fiber of working example A3 is about 45%%, which makes the fiber suitable for draw-spinning.

Textiles/fabrics will usually go through dyeing and finishing process. Such process(es) may sometimes jeopardize the functionality of the final product. Hence, washing fastness of the fabrics of the present disclosure was determined according to the procedure set forth in AATCC 61-2008 standard.

The fiber of working example A3 was processed into a plain-woven fabric and dyed with the testing dye. During the dyeing process, the dyeing system was heated from room temperature (about 23-27° C.) to about 100° C. at a rate of about 2° C./min and maintained at about 100° C. for about 30 minutes; then, the dyeing system was cool to about 75° C. at a rate of about 2° C./min and maintained at 75° C. for 15 minutes so that the color can be fixed onto the fabric. Test results showed that the dyed fabric had a washing fastness of at least level 4, which is acceptable by the textile field.

Furthermore, the LOI test was conducted to determine the flammability of the dyed fabric. The LOI value of the dyed fabric made from the fiber of working example A3 is 27, which belongs to the nonflammable grade.

The elementary composition of the polyphosphate used in the above-described examples was analyzed by an energy dispersive X-ray spectrometer (EDS, Serial No. JSM6510/INCAZ-act sn50018). The result showed that the phosphor content of the polyphosphate is about 12.22 wt %.

Since the maximum amount of the phosphorous-containing flame retardant powder in the total composition is about 6 wt %, the halogen-free flame retarding masterbatch prepared from the composition has a phosphor content of about 7332 ppm (0.1222*0.06=7332*10$^{-6}$) at most. In comparison, conventional phosphorus-containing flame retarding materials has a phosphor content of about 40000 ppm. Hence, the flame retarding materials according to the present disclosure has significantly less phosphorous content then the conventional art does.

In an optional embodiment, the phosphorous content of the halogen-free flame retarding masterbatch with low phosphorous content is less than about 8000 ppm.

The composition of the gas generated during the combustion of the fiber of working example A3 was analyzed by gas chromatography (Chromatographer: BARIAN 4000 GC/MS/MS). The result shows that the ambient air of the burned A3 fiber comprises about 40 ppm Carbon Oxide, about 3200 ppm carbon dioxide, about 410 ppm water vapor. Moreover, no toxic gas (such as dioxins) is generated during the combustion.

It will be understood that the above description of embodiments is given by way of example only and that various modifications may be made by those with ordinary skill in the art. The above specification, examples and data provide a complete description of the structure and use of exemplary embodiments of the disclosure. Although various embodiments of the disclosure have been described above with a certain degree of particularity, or with reference to one or more individual embodiments, those with ordinary skill in the art could make numerous alterations to the disclosed embodiments without departing from the spirit or scope of this disclosure.

What is claimed is:

1. A composition for preparing a halogen-free flame retarding masterbatch with low phosphorous content, comprising:
    a phosphorous-containing flame retardant powder present in the composition in an amount of about 0.1 wt % to about 6 wt %;
    a sulfur-containing flame retardant powder present in the composition in an amount of about 0.1 wt % to about 5 wt %;
    a tertiary ammonium salt having tri-functional groups or a quaternary ammonium salt having tetra-functional groups present in the composition in an amount of about 0.1 wt % to about 5 wt %;
    a dispersing agent present in the composition in an amount of about 0.1 wt % to about 5 wt %; and
    a thermoplastic polymer present in the composition in an amount of about 79 wt % to about 99.6 wt %.

2. The composition of claim 1, wherein the phosphorous-containing flame retardant powder is polyphosphate ester or ammonium polyphosphate.

3. The composition of claim 1, wherein the phosphorous-containing flame retardant powder has a diameter of about 1-10 μm.

4. The composition of claim 1, wherein the sulfur-containing flame retardant powder is aluminum sulfate, zinc sulfate, barium sulfate or ammonium sulfate.

5. The composition of claim 1, wherein the tertiary ammonium salt having tri-functional groups or the quaternary ammonium salt having tetra-functional groups is triethylammonium salt, trivinylammonium salt, tetravinylammonium salt, triallylamine, triallyl trimesate, triallyl cyanurate, triallyl isocynaurate or triacryloylhexahydro-1,3,5-triazine.

6. The composition of claim 1, wherein the dispersing agent is selected from a group consisting of $C_{15-38}$ alkanes, $C_{15-38}$ esters, $C_{15-38}$ organic acids, and a mixture thereof.

7. The composition of claim 1, wherein the thermoplastic polymer is polyester, polyamide or polypropylene.

8. The composition of claim 7, wherein the polyester is polyethylene terephthalate, polybutylene terephthalate, or polytrimethylene terephthalate.

9. The composition of claim 7, wherein the polyamide is nylon 6, nylon 6.6, or nylon 6.10.

10. A method for preparing a halogen-free flame retarding masterbatch with low phosphorous content, comprising the steps of:
    admixing a phosphorous-containing flame retardant powder in an amount of about 0.1 wt % to about 6 wt %, a tertiary ammonium salt having tri-functional groups or a quaternary ammonium salt having tetra-functional groups in an amount of about 0.1 wt % to about 5 wt %, a thermoplastic polymer in an amount of about 79 wt % to about 99.6 wt %, and a dispersing agent in an amount of about 0.1 wt % to about 5 wt % to form an admixture;

adding a sulfur-containing flame retardant powder in an amount of about 0.1 wt % to about 5 wt % into the admixture to form a composition;

compounding the composition for about 1-20 minutes at a compounding temperature of about 220-270° C. to obtain a compounded product; and pelletizing the compounded product to obtain the halogen-free flame retarding masterbatch with low phosphorous content.

11. The method of claim 10, wherein the phosphorous-containing flame retardant powder is polyphosphate ester or ammonium polyphosphate.

12. The method of claim 10, wherein the phosphorous-containing flame retardant powder has a diameter of about 1-10 μm.

13. The method of claim 10, wherein the sulfur-containing flame retardant powder is aluminum sulfate, zinc sulfate, barium sulfate or ammonium sulfate.

14. The method of claim 10, wherein the tertiary ammonium salt having tri-functional groups or the quaternary ammonium salt having tetra-functional groups is triethylammonium salt, trivinylammonium salt, tetravinylammonium salt, triallylamine, triallyl trimesate, triallyl cyanurate, triallyl isocynaurate or triacryloylhexahydro-1,3,5-triazine.

15. The method of claim 10, wherein the dispersing agent is selected from a group consisting of $C_{15-38}$ alkanes, $C_{15-38}$ esters, $C_{15-38}$ organic acids, and a mixture thereof.

16. The method of claim 10, wherein the thermoplastic polymer is polyester, polyamide or polypropylene.

17. The method of claim 16, wherein the polyester is polyethylene terephthalate, polybutylene terephthalate, or polytrimethylene terephthalate.

18. The method of claim 16, wherein the polyamide is nylon 6, nylon 6.6, or nylon 6.10.

19. A halogen-free flame retarding material with low phosphorous content, comprising a thermoplastic polymer, and a flame retardant dispersed within the thermoplastic polymer, wherein the flame retardant comprises a phosphorous-containing flame retardant and a sulfur-containing flame retardant, a weight ratio of the thermoplastic polymer to the sum of the phosphorous-containing and the sulfur-containing flame retardants is about 7:1 to 500:1, and the halogen-free flame retarding material is prepared by the method of claim 10.

20. The halogen-free flame retarding material of claim 19, wherein the halogen-free flame retarding material has a phosphorous content less than about 8000 ppm.

21. The halogen-free flame retarding material of claim 19, wherein the weight ratio is about 7:1 to about 10:1.

22. The halogen-free flame retarding material of claim 19, wherein the halogen-free flame retarding material is in a form of a masterbatch, a fiber, a filament, a yarn, a textile, a film, a sheet, or a chip.

* * * * *